US012763437B2

(12) United States Patent
Ryu

(10) Patent No.: US 12,763,437 B2
(45) Date of Patent: Oct. 13, 2026

(54) BATTERY MODULE AND BATTERY PACK INCLUDING THE SAME

(71) Applicant: LG Energy Solution, Ltd., Seoul (KR)

(72) Inventor: Kye Yeon Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 818 days.

(21) Appl. No.: 18/020,747

(22) PCT Filed: Jan. 19, 2022

(86) PCT No.: PCT/KR2022/000985

§ 371 (c)(1),
(2) Date: Feb. 10, 2023

(87) PCT Pub. No.: WO2022/164119

PCT Pub. Date: Aug. 4, 2022

(65) Prior Publication Data

US 2024/0039125 A1 Feb. 1, 2024

(30) Foreign Application Priority Data

Jan. 28, 2021 (KR) ........................ 10-2021-0012230

(51) Int. Cl.
*H01M 50/507* (2021.01)
*H01M 50/211* (2021.01)

(52) U.S. Cl.
CPC ....... *H01M 50/507* (2021.01); *H01M 50/211* (2021.01)

(58) Field of Classification Search
CPC .......................... H01M 50/507; H01M 50/211
See application file for complete search history.

(56) References Cited

U.S. PATENT DOCUMENTS

2017/0025688 A1 1/2017 Ikeda et al.
2018/0194235 A1* 7/2018 Kim et al.
2019/0237777 A1 8/2019 Ikeda et al.
2020/0189400 A1 6/2020 Kim et al.
2021/0020891 A1 1/2021 Min et al.
2021/0226291 A1 7/2021 Kim et al.
2021/0265707 A1 8/2021 Jung et al.
2021/0280949 A1 9/2021 Kim et al.
2022/0052391 A1 2/2022 Kim et al.
2022/0140447 A1 5/2022 Choi et al.
2022/0158308 A1 5/2022 Chi et al.
2025/0246696 A1 7/2025 You et al.

FOREIGN PATENT DOCUMENTS

CN 107925028 A 4/2018
CN 110336070 A 10/2019
CN 111989798 A 11/2020
CN 112119532 A 12/2020
EP 3694017 A1 8/2020
EP 3876303 A1 9/2021
JP 2019-500736 A 1/2019
KR 10-2010-0063376 A 6/2010
KR 10-2014-0084619 A 7/2014
KR 10-1868255 B1 6/2018
KR 10-2034208 B1 10/2019
KR 10-2020-0084450 A 7/2020
KR 20200084450 A * 7/2020
KR 10-2020-0110082 A 9/2020
KR 10-2020-0141717 A 12/2020
KR 10-2020-0142240 A 12/2020
KR 10-2020-0142242 A 12/2020
KR 10-2020-0142455 A 12/2020
WO 2020116880 A1 6/2020
WO 2020251143 A1 12/2020
WO 2020251176 A1 12/2020

OTHER PUBLICATIONS

KR20200084450A_Machine Translation (Year: 2020).*

* cited by examiner

*Primary Examiner* — Jonathan Johnson
(74) *Attorney, Agent, or Firm* — Bryan Cave Leighton Paisner LLP

(57) ABSTRACT

A battery module and a battery pack including the same are provided. The battery module includes a battery cell stack in which a plurality of battery cells including protruded electrode leads are stacked, the battery cell including protruding portions respectively formed at both ends of a lower edge of the battery cell, a module frame that houses the battery cell stack, and busbar frames disposed to a front and a rear of the battery cell stack where the electrode leads are protruded, at least one of the busbar frames including a guide portion extending to a lower surface of the battery cell stack, the guide portion comprising a guide groove into which the protruding portion is inserted, and the guide groove including an adjusting portion of which a width becomes narrower from where the battery cell is positioned to where the busbar frame is positioned.

10 Claims, 16 Drawing Sheets

BATTERY MODULE AND BATTERY PACK INCLUDING THE SAME

CROSS-REFERENCE TO RELATED APPLICATION

This application is a National Stage Application of International Application No. PCT/KR2022/000985, filed on Jan. 19, 2022, which claims priority to and the benefit of Korean Patent Application No. 10-2021-0012230 filed on Jan. 28, 2021, the disclosures of which are incorporated herein by reference in their entirety.

FIELD

The present disclosure relates to a battery module and a battery pack including the same, and more specifically, it relates to a battery module that can effectively utilize a space and a battery pack including the same.

BACKGROUND

In modern society, as portable devices such as mobile phones, laptops, camcorders, and digital cameras are used in daily life, the development of technologies related to mobile devices as described above is becoming active. In addition, since a rechargeable batteries that can be charged and discharged is being used as a power source of electric vehicles (EV), hybrid electric vehicles (HEV), and plug-in hybrid electric vehicles (P-HEV), the need for rechargeable battery development is increasing as a method for solving air pollution of conventional gasoline vehicles that use fossil fuels.

Currently commercially available rechargeable batteries include a nickel cadmium battery, a nickel hydrogen battery, a nickel zinc battery, and a lithium rechargeable battery, and the lithium rechargeable battery is attracting attention for its merits of charging and discharging freely, its self-discharge rate is very low, and its energy density is high because it has almost no memory effect compared to the nickel-based rechargeable battery.

The lithium rechargeable battery mainly uses a lithium-based oxide and a carbon material as positive and negative active materials, respectively. A lithium rechargeable battery includes an electrode assembly in which the positive and negative electrode plates are respectively coated with these positive and negative active materials with a separator interposed therebetween, and an exterior material that seals and houses the electrode assembly together with an electrolyte solution, that is, a battery case.

In general, a lithium rechargeable battery can be classified into a can-type rechargeable battery in which the electrode assembly is built into a metal can and a pouch-type secondary battery in which the electrode assembly is built in a pouch of an aluminum laminate sheet according to the shape of the exterior material.

In the case of a rechargeable battery used in small devices, two to three battery cells are disposed, but in the case of a rechargeable battery used in a medium or large device such as an automobile, a battery module in which a plurality of battery cells are electrically connected is used. In such a battery module, a plurality of battery cells are coupled serially or in parallel to form a battery cell stack, and thus capacity and output are improved. In addition, at least one battery module may be mounted together with various control and protection systems such as a battery management system (BMS) and a cooling system to form a battery pack.

As other demands such as down-sizing and capacity increase are continuing for these battery modules and battery packs, there is a need for a way to efficiently utilize the space inside the battery module and battery pack.

SUMMARY

Technical Problem

The present disclosure is to provide a battery module with increased spatial utility and a battery pack including the same.

However, the problems to be solved by the embodiments of the present disclosure are not limited to the above-described problems and can be variously expanded in the range of technical ideas included in the present disclosure.

Technical Solution

A battery module according to an embodiment of the present disclosure includes: a battery cell stack in which a plurality of battery cells including protruded electrode leads are stacked; a module frame that houses the battery cell stack; and busbar frames disposed to a front and a rear of the battery cell stack where the electrode leads are protruded. The battery cell includes protruding portions respectively formed at both ends of a lower edge of the battery cell. At least one of the busbar frames include a guide portion extending to a lower surface of the battery cell stack. A guide groove into which the protruding portion is inserted is formed in the guide portion, and the guide groove includes an adjusting portion of which a width becomes narrower from where the battery cell is positioned to where the busbar frame is positioned.

When the busbar frame is disposed to the front or the rear of the battery cell stack, the protruding portion of the battery cell is inserted into the guide groove.

The protruding portion may be obliquely bent by the adjusting portion.

The adjusting portion may be opened in a direction to where the battery cell is located.

The guide groove may include an inner portion that is farther from the battery cell than the adjusting portion, and the protruding portion may be inserted into the inner portion.

The adjusting portion may include a first side and a second side that face each other, and the first side and the second side may become closer from where the battery cell is positioned to where the busbar frame is positioned.

The first face may form an inclined plane oblique to a protruding direction of the electrode lead, and when the protruding portion may be inserted into the guide groove, the first side is positioned corresponding to the protruding portion.

The second side may be parallel with the protruding direction of the electrode lead.

The guide groove may be formed in a plurality to correspond to each of the plurality of battery cells.

A busbar is mounted to the busbar frame, and the electrode lead is bonded to the busbar.

Advantageous Effects

According to the embodiments of the present disclosure, the portion, called the bat-ear, of the battery cell may be maintained inclined by the adjusting portion provided in the guide groove, thereby reducing the height of the battery module. In other words, the space can be used efficiently.

Energy capacity can be increased as much as the reduced height of the battery module. In addition, it is possible to reduce the amount of thermal conductive resin used, which has the effect of reducing costs.

The effects of the present disclosure are not limited to the effects mentioned above, and other effects not mentioned will be clearly understood by a person of an ordinary skill in the art from the description of the claimed range.

DETAILED DESCRIPTION

Figure 1:
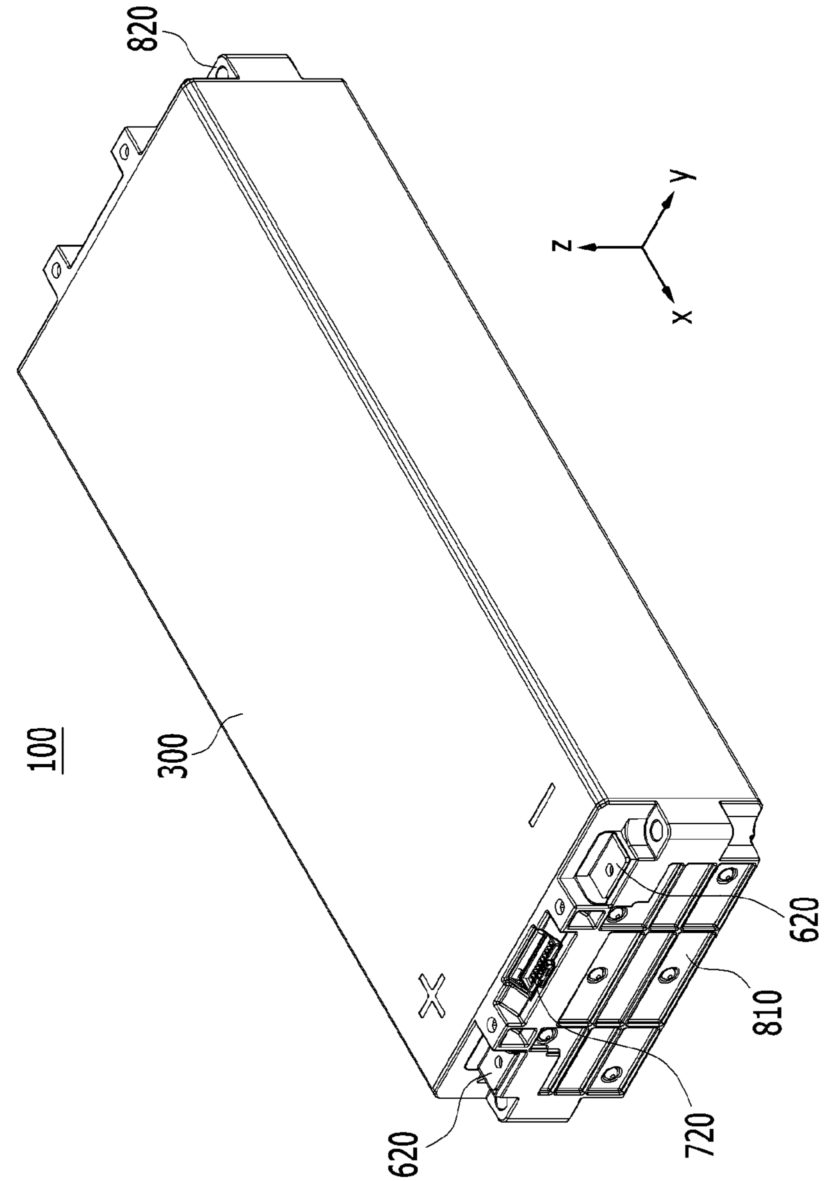
FIG. 1 is a perspective view of a battery module according to an embodiment of the present disclosure.

Hereinafter, an embodiment of the present disclosure will be described in detail and thus a person of an ordinary skill in the technical field to which the present disclosure belongs can easily implement it with reference to the accompanying drawing. The present disclosure may be embodied in many different forms and is not limited to the embodiments described herein.

In order to clearly explain the present disclosure, parts irrelevant to the description are omitted, and the same reference sign is attached to the same or similar constituent elements throughout the specification.

In addition, since the size and thickness of each component shown in the drawing are arbitrarily indicated for convenience of explanation, the present disclosure is not necessarily limited to the illustrated drawings. In the drawings, the thicknesses of layers, films, panels, regions, etc., are exaggerated for clarity. In the drawing, for convenience of explanation, the thickness of some layers and regions is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction.

In addition, unless explicitly described to the contrary, the word "comprise", and variations such as "comprises" or "comprising", will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Figure 2:
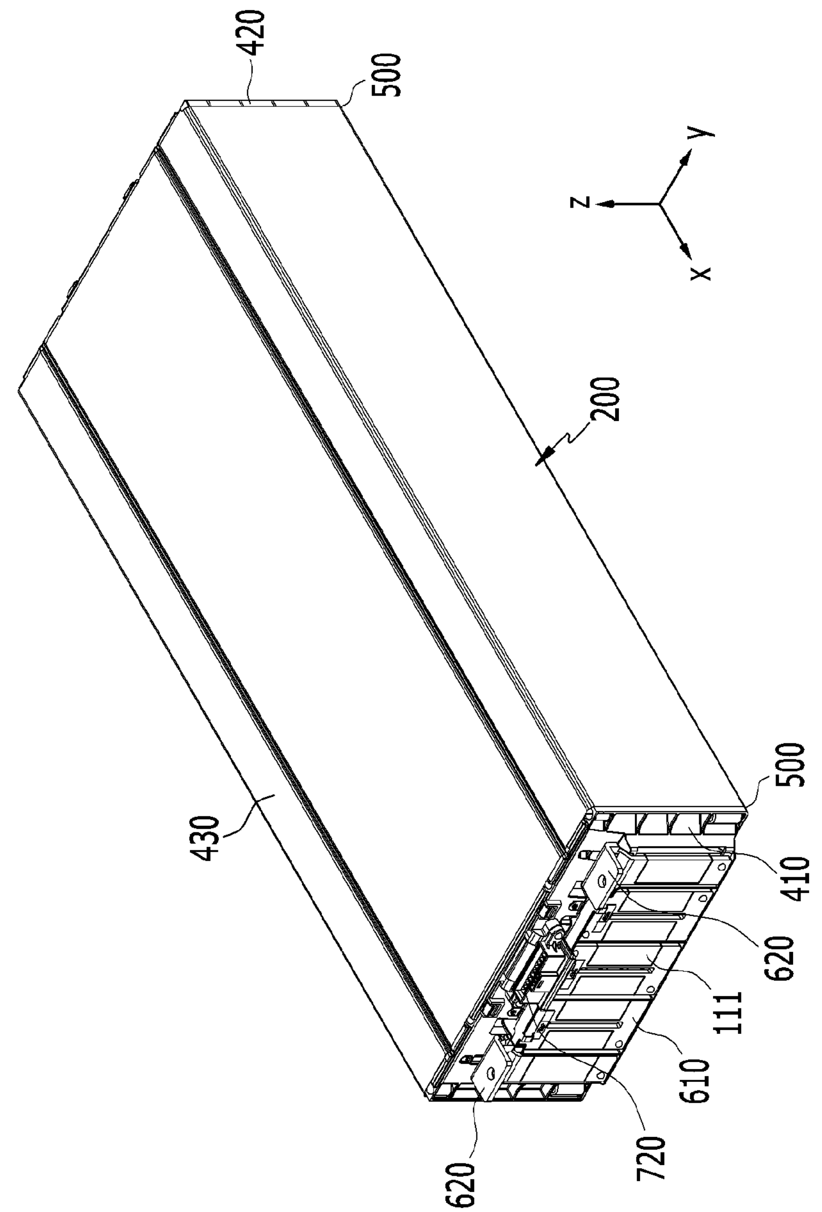
FIG. 2 is a perspective view of the battery module of FIG. 1 from which a module frame and an end plate are omitted.
Figure 3:
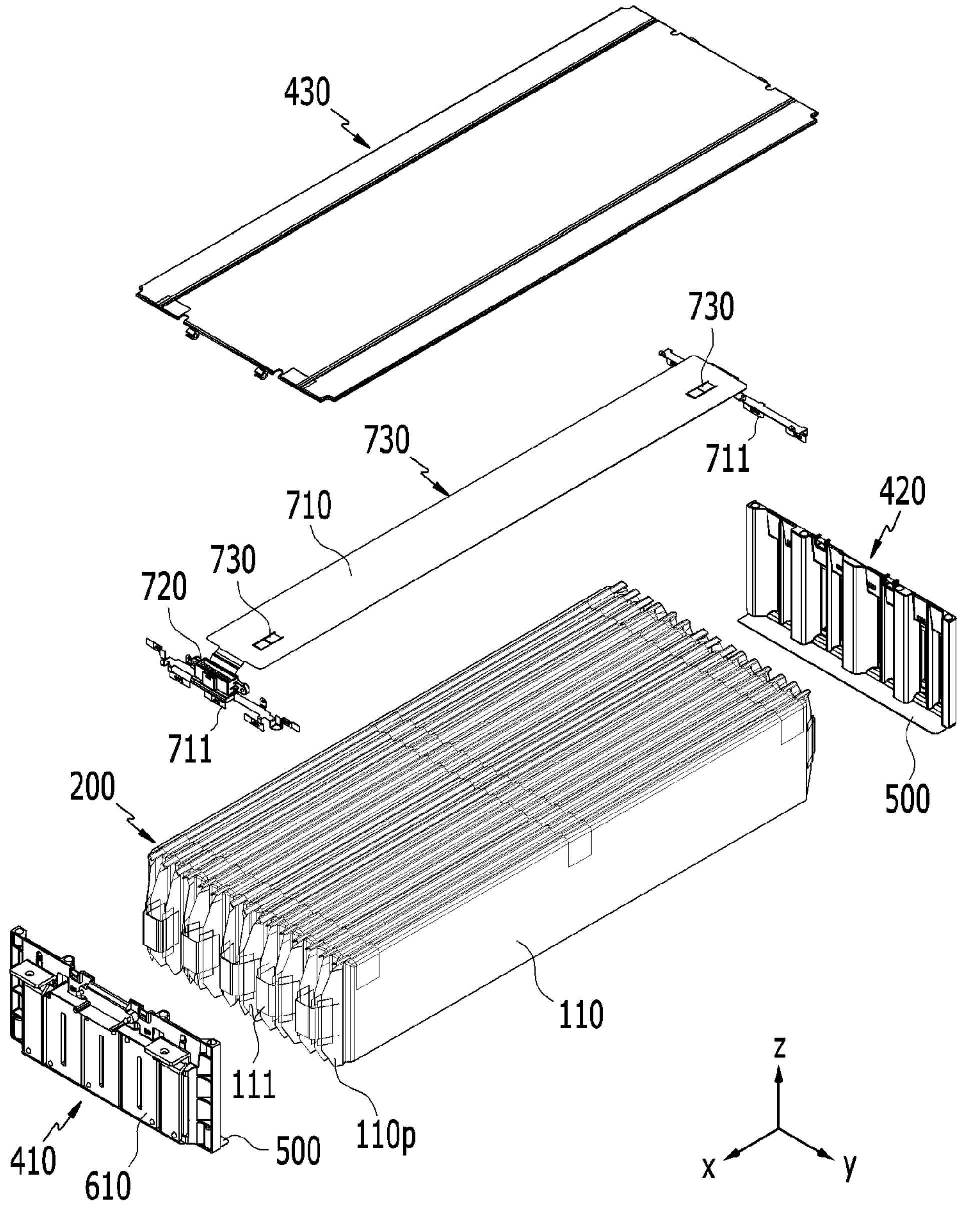
FIG. 3 is an exploded perspective view of the battery module of FIG. 2.
Figure 4:
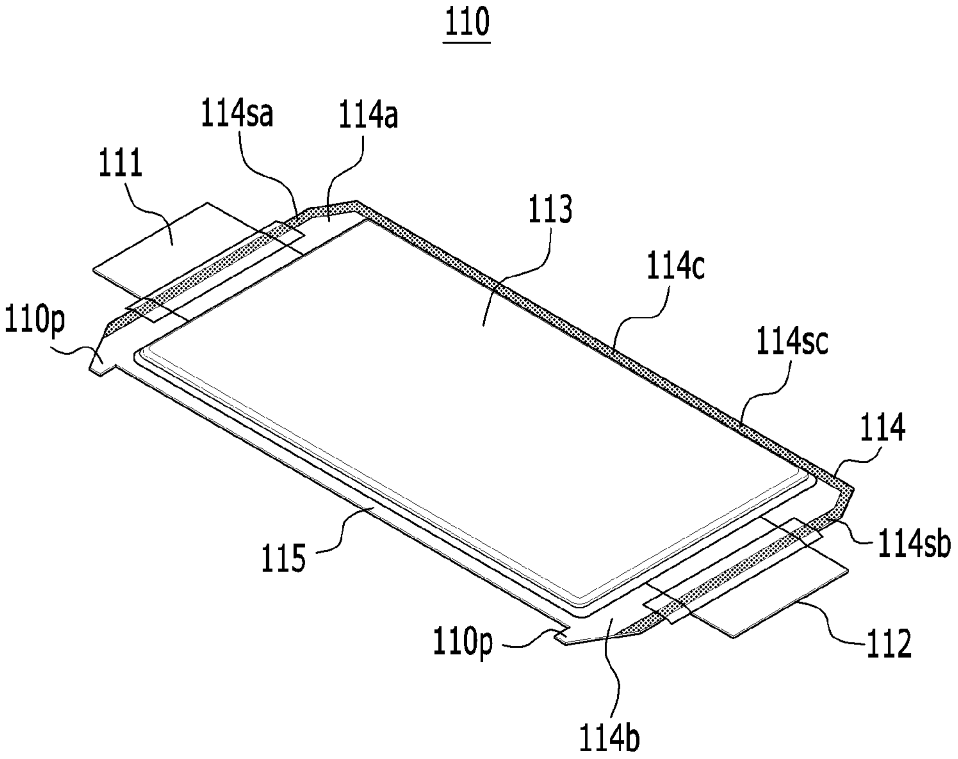
FIG. 4 is a perspective view of a battery cell included in the battery module of FIG. 3.

FIG. 1 is a perspective view of a battery module according to an embodiment of the present disclosure. FIG. 2 is a perspective of the battery module of FIG. 1 in a state that a module frame and an end plate are omitted. FIG. 3 is an exploded perspective view of the battery module of FIG. 2. FIG. 4 is a perspective view of a battery cell included in the battery module of FIG. 3.

Referring to FIG. 1 to FIG. 4, a battery module 100 according to an embodiment of the present disclosure includes a battery cell stack 200 where a plurality of battery cells 110 including protruded electrode leads 111 and 112 are stacked, a module frame 300 accommodating the battery cell stack 200, and bus bar frames 410 and 420 that are disposed front and rear of the battery cell stack 200 including the protruded electrode leads 111 and 112. Here, the front means the x-axis direction of the battery cell stack 200, the rear means the −x-axis direction of the battery cell stack 200, and both sides mean planes in the y-axis and −y-axis directions of the battery cell stack 200, respectively. In addition, a lower surface means a surface in the −z-axis direction of the battery cell stack 200, and an upper surface means a surface in the z-axis direction of the battery cell stack 200. However, these are aspects indicated for convenience of explanation, and may vary depending on the position of the target object or the position of the observer.

First, the battery cell 110 is preferably a pouch-type battery cell, and may be formed in a rectangular sheet-like structure. The electrode leads of the battery cell 110 according to the present embodiment include protruded first and second electrode leads 111 and 112. Specifically, referring to FIG. 4, the battery cell 110 according to the present embodiment has a structure in which the first and second electrode leads 111 and 112 face each other based on the cell body 113 and they are protruded from one end 114*a* and the other end 114*b*, respectively. More specifically, the first and second electrode leads 111 and 112 are connected to an electrode assembly (not shown), and protrude from the electrode assembly (not shown) to the outside of the battery cell 110. The first and second electrode leads 111 and 112 have different polarities, and for example, one of them may be a positive lead 111 and the other may be a negative electrode lead 112. That is, based on one battery cell 110, the positive electrode lead 111 and the negative electrode lead 112 may be protruded in opposite directions.

Meanwhile, the battery cell 110 may be manufactured by adhering both ends 114*a* and 114*b* of the cell case 114 to one side 114*c* connecting them with the electrode assembly (not shown) housed in the cell case 114. In other words, the battery cell 110 according to the present embodiment has a total of three sealing portions 114*sa*, 114*sb*, and 114*sc*, and the sealing portions 114*sa*, 114*sb*, and 114*sc* are sealed by a method such as heat sealing, and the other side may be formed of a connection portion 115. The cell case 114 may be formed of a laminate sheet including a resin layer and a metal layer.

In addition, the connection portion 115 may extend along one edge of the battery cell 110, and a protruding portion 110*p* of the battery cell 110, called a bat-ear, is formed at both ends of the connection portion 115. That is, the battery cell 110 includes protruding portions 110*p* respectively formed at both ends of the lower edge of the battery cell 110. When the battery cells 110 are gathered to form the battery cell stack 200, the protruding portions 110*p* are positioned on the lower surface of the battery cell stack 200.

The battery cells 110 may be formed in a plurality, and a plurality of battery cells 110 are stacked to be electrically connected to each other to form the battery cell stack 200. In particular, as shown in FIG. 3, a plurality of battery cells 110 may be stacked in a direction parallel to the y-axis. Accordingly, one electrode lead 111 of the battery cell 110 may be protruded toward the x-axis direction, and the other electrode lead 112 may be protruded toward the −x-axis direction.

Figure 5:
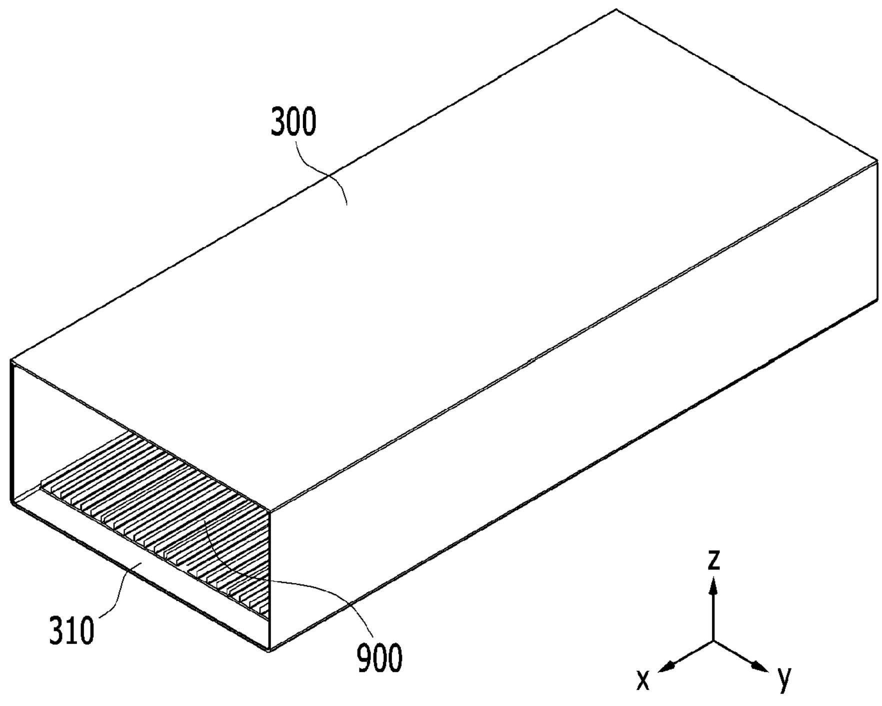
FIG. 5 is a perspective view of a module frame included in the battery module of FIG. 1.

FIG. 5 is a perspective view of a module frame included in the battery module of FIG. 1. The battery cell stack 200 and the busbar frames 410 and 420 shown in FIG. 2 are housed in the module frame 300 shown in FIG. 5, and the battery module 100 shown in FIG. 1 may be completed by bonding end plates 810 and 820 to the module frame 300.

Referring to FIG. 1 and FIG. 5, the module frame 300 may be a member in which a front portion and a rear portion are open, and a ceiling portion, a bottom portion, and both side portions are integrated. The battery cell stack 200 may be accommodated in the module frame 300. Here, the front portion means a plane in the x-axis direction of the module frame 300, and the rear portion means a plane in the −x-axis direction of the module frame 300. In addition, the ceiling portion means a plane in the z-axis direction of the module frame 300, and the bottom portion means a plane in the −z-axis direction of the module frame 300. In addition, the both side portions refer to the y-axis and −y-axis directions of the module frame 300. However, this is an exemplary structure of the module frame 300, and as another form, the bottom portion and the both side portions are integrated, and the ceiling portion joined to both side portions is also possible.

On the other hand, the end plates 810 and 820 may cover the open front and rear portions, respectively, and the module frame 300 and the end plates 810 and 820 may be bonded to corresponding corners. There is no particular limitation on the bonding method, but welding bonding may be used.

On the other hand, a thermally conductive resin layer 900 may be positioned on the bottom of the module frame 300. Specifically, the thermally conductive resin layer 900 may be positioned between the battery cell stack 200 (refer to FIG. 3) and the bottom of the module frame 300.

The thermally conductive resin layer 900 may include a thermally conductive resin, particularly a thermally conductive adhesive material. For example, it may include at least one of a silicone-based material, a urethane-based material, and an acrylic-based material, particularly preferably a urethane-based material.

The thermally conductive resin has excellent thermal conductivity, and heat generated in the battery cells 110 may be discharged to the outside through the thermally conductive resin layer 900 and the bottom portion of the module frame 300. The thermally conductive resin layer 900 can be regarded as a kind of cooling device. However, the thermally conductive resin includes a thermally conductive adhesive material, and may be a liquid or a material that solidifies after the battery cell stack 200 is laminated thereon when applied. Therefore, the thermally conductive resin layer 900 can fix the battery cell stack 200 in the battery module 100. That is, the thermally conductive resin layer 900 according to the present embodiment not only improves the heat dissipation characteristic for the battery cell stack 200 but also has a function of effectively fixing the battery cell stack 200.

Meanwhile, referring to FIG. 3 to FIG. 5, the thermally conductive resin layer 900 is not provided on the entire bottom portion of the module frame 300, but an uncoated portion 310 where the thermally conductive resin is not applied may be provided in the front portion and both ends in the direction of the rear portion among the bottom portion. The protruding portion 110*p* of the battery cell 110 may be positioned on the uncoated portion 310. That is, the uncoated portion 310 may be provided to secure a space in which the protruding portion 110*p* of the battery cell 110 can be positioned. On the other hand, in another embodiment of the present disclosure, instead of forming the uncoated portion 310, the thermally conductive resin may be applied to the area of the uncoated portion 310 to a thinner thickness than that of the thermally conductive resin layer 900.

Hereinafter, referring to FIG. 6 and FIG. 7, the busbar frame according to the present embodiment will be described in detail.

Figure 6:
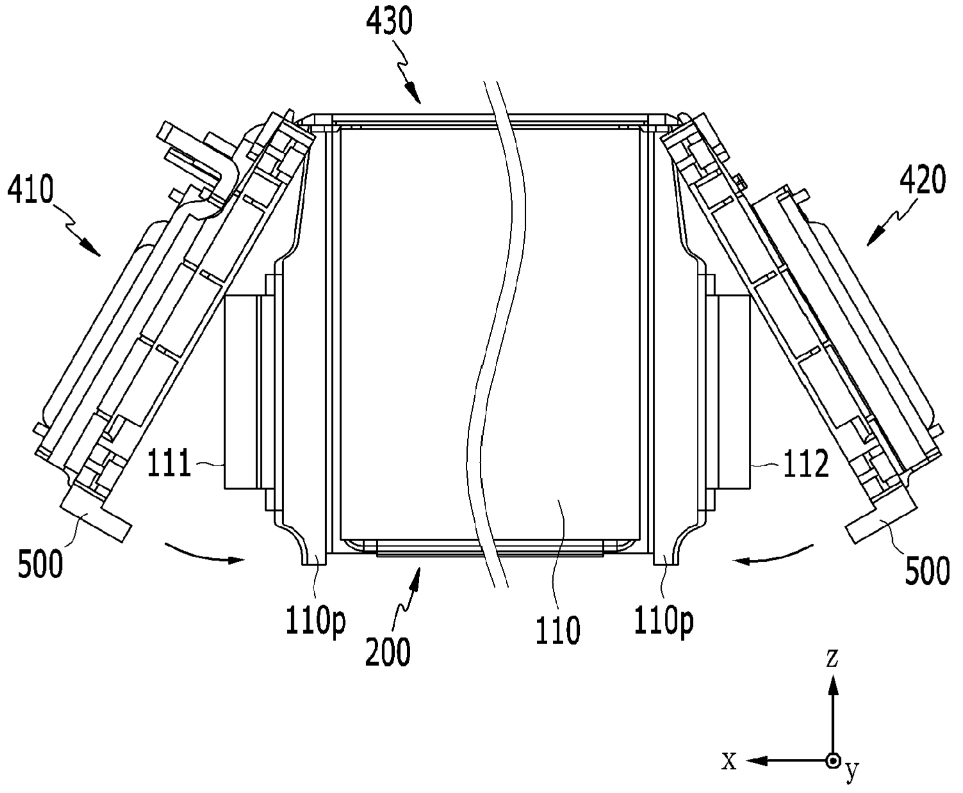
FIG. 6 is a top plan view showing the battery cell stack and the busbar frame included in the battery module of FIG. 3 along the −y-axis direction on the xz plane.
Figure 7:
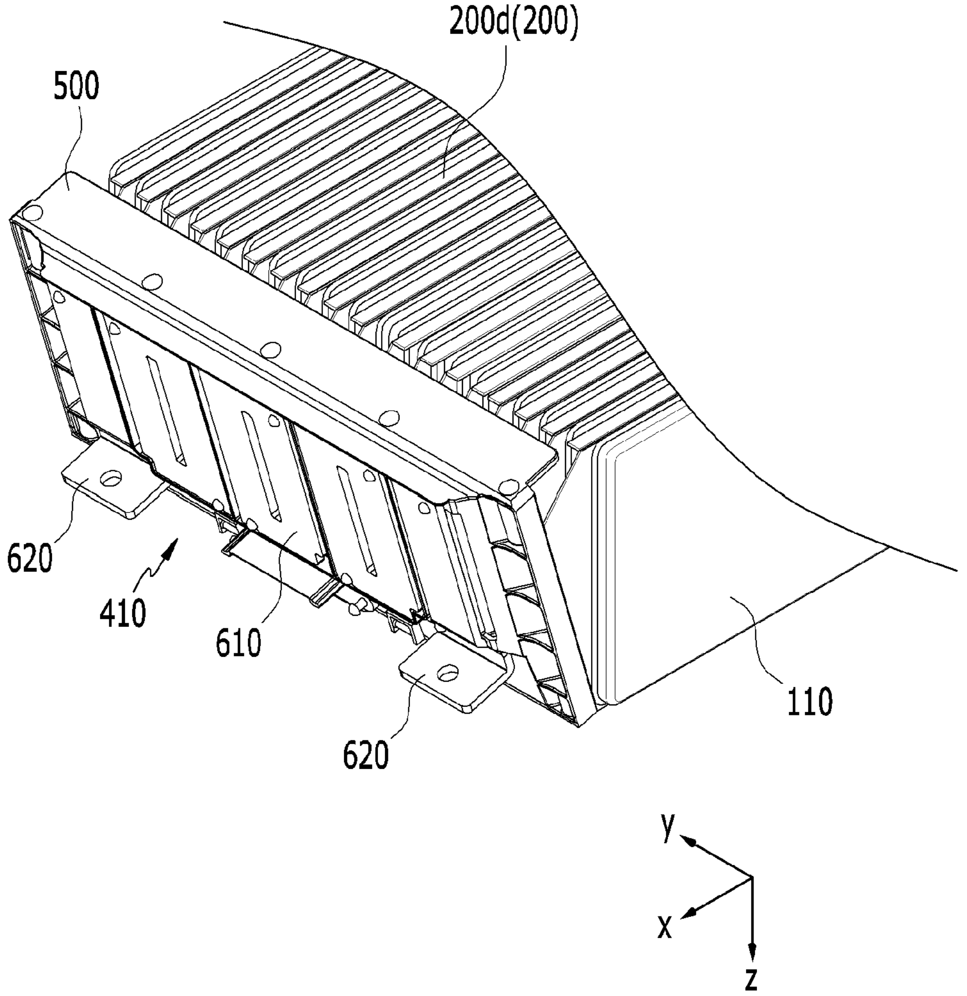
FIG. 7 is a perspective view showing the battery cell stack and the busbar frame included in the battery module of FIG. 3 upside down.

FIG. 6 is a top plan view showing the battery cell stack and the busbar frame included in the battery module of FIG. 3 along the −y-axis direction on the xz plane. FIG. 7 is a perspective view showing the battery cell stack and the busbar frame included in the battery module of FIG. 3 upside down. More specifically, FIG. 7 shows the battery cell stack 200 that is inverted such that the bottom 200*d* faces upward.

Referring to FIG. 2, FIG. 3, FIG. 6, and FIG. 7, the busbar frames 410 and 420 according to the present embodiment, as described above, are disposed to the front and rear of the battery cell stack 200 with the electrode leads 111 and 112 protruded.

The busbar frames 410 and 420 may be equipped with a busbar 610 and a terminal busbar 620. Specifically, for each of the busbar frames 410 and 420, the busbar 610 and the terminal busbar 620 may be positioned on the opposite side of the side facing the battery cell stack 200. In addition, a module connector 720 of a sensing unit 700, which will be described later, can also be positioned on the opposite side of the side facing the battery cell stack 200 among the busbar frames 410 and 420.

Slits may be formed in the busbar frames 410 and 420. The electrode leads 111 and 112 of the battery cell 110 may be bent after passing through the slits and bonded to the busbar 610 or the terminal busbar 620. The battery cells 110 forming the battery cell stack 200 may be electrically connected to each other through the busbar 610. There is no special restriction on how the electrode leads 111 and 112 are bonded to the busbar 610 or the terminal busbar 620, but for example, welding can be applied.

The electrode leads 111 and 112 of some battery cells 110 are connected to the terminal busbar 620 to form a high voltage (HV) connection. Here, the HV connection is a connection that serves as a power source for supplying power, and refers to a connection between battery cells or a connection between battery modules. A part of the terminal busbar 620 is exposed to the outside of the end plates 810 and 820 to be described later, and the battery module 100 can be electrically connected to another battery module or a battery disconnect unit (BDU) through the terminal busbar 620.

The battery module 100 according to the present embodiment may further include an upper cover 430 positioned on the battery cell stack 200. The upper cover 430 may cover the corresponding area with a size corresponding to the upper surface of the battery cell stack 200. In addition, each of the opposing sides of the upper cover 430 may be combined with the busbar frames 410 and 420. In the process of accommodating the battery cell stack 200 in the module frame 300, the upper cover 430 may protect the sensing unit 700, which will be described later.

On the other hand, hinge coupling may be applied to the coupling between the busbar frames 410 and 420 and the upper cover 430. The assembly process of the battery cell stack 200 and the busbar frames 410 and 420 can proceed as follows. Referring to FIG. 6, the upper cover 430 is placed on the battery cell stack 200, and each busbar frames 410 and 420 is rotated. Next, the electrode leads 111 and 112 of the battery cell 110 are pulled out by passing them through the slits formed in the respective busbar frames 410 and 420. Through the rotation, the respective busbar frames 410 and 420 are vertically disposed to the front and the rear of the battery cell stack 200.

In this case, at least one of the busbar frames 410 and 420 include a guide portion 500 extending to the bottom **200*d* of the battery cell stack 200. Here, the bottom 200*d* of the battery cell stack 200 means a surface in the −z-axis direction of the battery cell stack 200, as described above. As shown in FIG. 6 and FIG. 7, both busbar frames 410 and 420 may include the guide portion 500**.

Hereinafter, referring to FIG. 8 to FIG. 11, a guide portion, a guide groove, and an adjusting portion according to the present embodiment will be described in detail.

Figure 8:
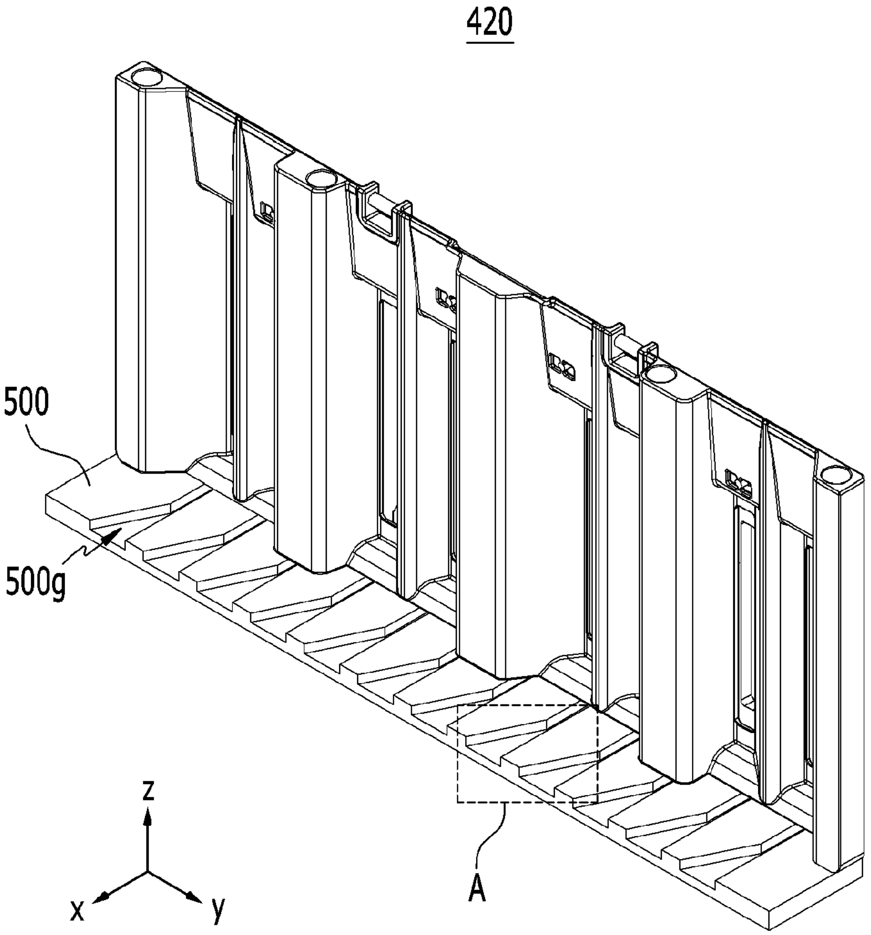
FIG. 8 is a perspective view of the busbar frame included in the battery module of FIG. 3.
Figure 9:
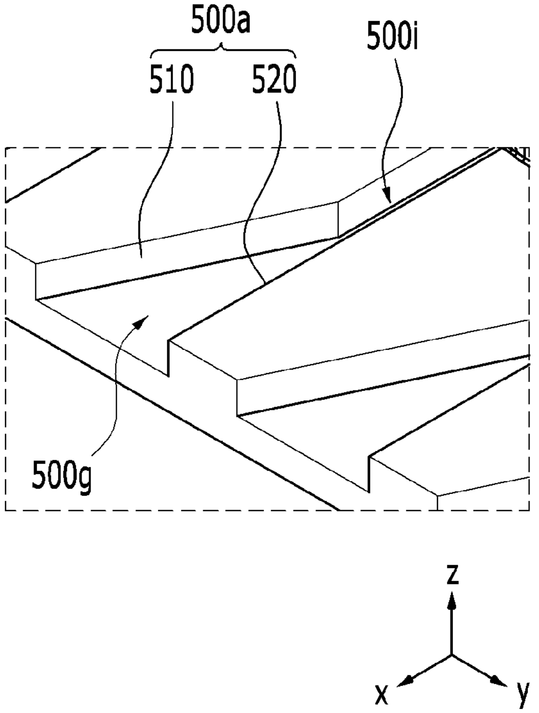
FIG. 9 is an enlarged view of the portion "A" in FIG. 8.
Figure 10:
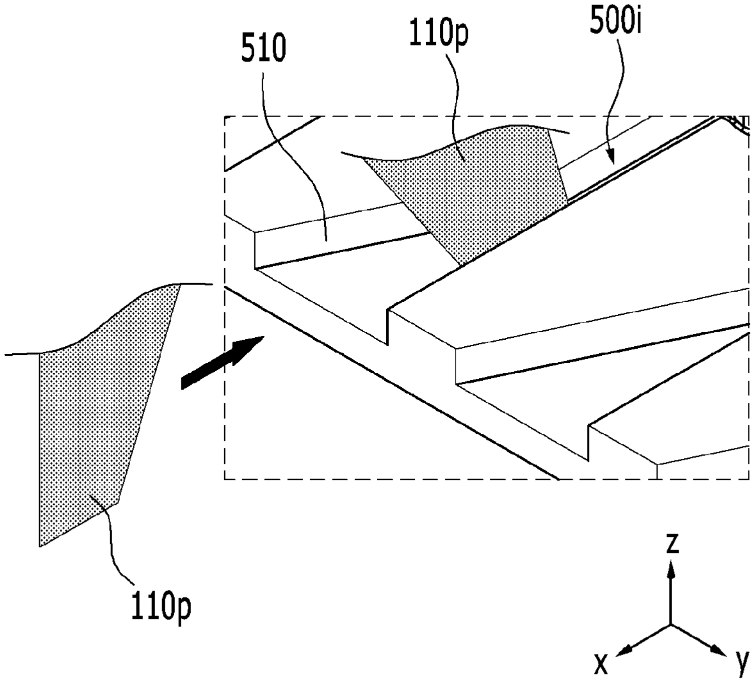
FIG. 10 shows a figure of a protruding portion of the battery cell being inserted in an adjusting portion of the guide groove shown in FIG. 9.
Figure 11:
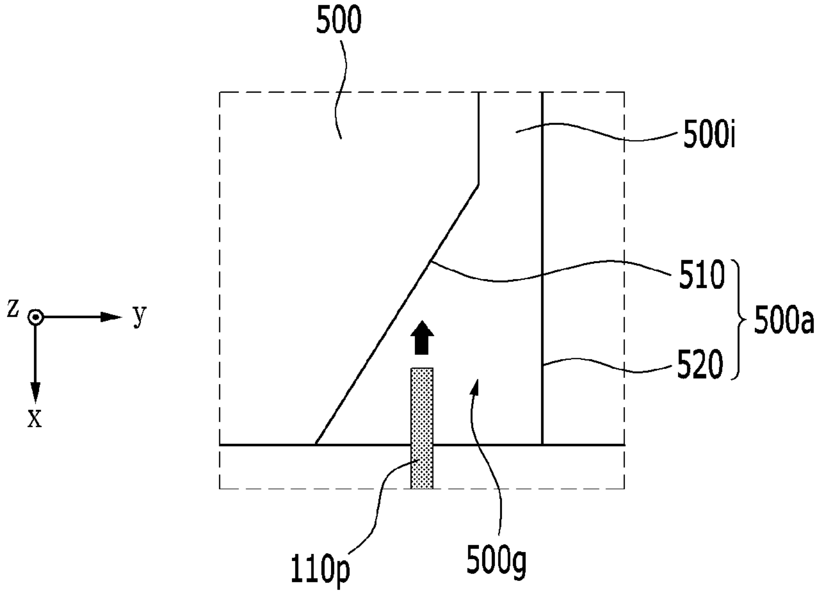
FIG. 11 is a top plan view of an adjusting portion of a guide groove shown in the −z-axis direction on the xy plane.

FIG. 8 is a perspective view of the busbar frame included in the battery module of FIG. 3. FIG. 9 is an enlarged view of the portion "A" in FIG. 8. FIG. 10 shows a figure in which a protruding portion of the battery cell is inserted in an adjusting portion of the guide groove shown in FIG. 9. FIG. 11 is a top plan view of an adjusting portion of a guide groove shown in the −z-axis direction on the xy plane.

In particular, FIG. 8 shows one busbar frame 420 of the busbar frames 410 and 420 included in the battery module of FIG. 3. Hereinafter, in order to avoid repetition of the description, one busbar frame 420 will be described as the basis, but the structure of a guide groove, an adjusting portion, and an inner portion according to the present embodiment may be provided for another busbar frame 410 as well. In addition, in FIG. 10, for convenience of explanation, only the protruding portion **110*p* of the configuration of the battery cell 110** is shown.

Referring to FIG. 8 to FIG. 11, a guide groove **500*g* where the protruding portion 110*p* of the battery cell 110 is inserted in the guide portion 500 according to the present embodiment is formed. Specifically, the guide groove 500*g* having a recessed shape may be formed on a surface facing the bottom 200*d* of the lower surface of the battery cell stack 200 of the guide portion 500**.

When the busbar frame 420 is disposed to the front or the rear of the battery cell stack 200, the protruding portion **110*p* positioned at the bottom 200*d* on the lower surface of the battery cell stack 200 can be inserted into the guide groove 500*g***.

In addition, the guide groove **500*g* according to the present embodiment includes the adjusting portion 500*a* whose width is narrowed from the position where the battery cell 110 is positioned to the position where the busbar frame 420 is positioned. That is, in the guide groove 500*g*, a region where a width is gradually narrowed from the portion where the battery cell 110 is positioned to the position where the busbar frame 420 is positioned corresponds to the adjusting portion 500*a*. A direction from where the battery cell 110 is positioned to where the busbar frame 420 is positioned corresponds to the −x-axis direction in FIG. 8 to FIG. 11. In addition, the guide groove 500*g* may include an inner portion 500*i* that is farther from the battery cell 110 than the adjusting portion 500*a*. That is, the guide groove 500*g* may include the adjusting portion 500*a* positioned relatively close to the battery cell 110 and the inner portion 500*i* positioned relatively far from the battery cell 110**.

As shown in FIG. 10, when the protruding portion **110*p* is inserted into the guide groove 500*g*, the protruding portion 110*p* may be bent obliquely by the adjusting portion 500*a* of which a width is narrowed. That is, the inserted protruding portion 110*p* may be naturally bent obliquely by one surface of the adjusting portion 500*a* forming an oblique inclination. The protruding portion 110*p* may finally be inserted up to the inner portion 500*i* of the guide groove 500*g***.

The adjusting portion **500*a* according to the present embodiment may be a portion opened in the direction in which the battery cell 110 is positioned among the guide groove 500*g*. That is, when the protruding portion 110*p* is inserted into the guide groove 500*g*, it can be inserted first into the adjusting portion 500*a***.

In addition, the adjusting portion **500*a* may include a first side 510 and a second side 520 facing each other, and the first side 510 and the second side 520 are closer as the busbar frame 420 is positioned from the position where the battery cell 110 is positioned. In this case, the first side 510 may be inclined to the protruding direction of the electrode leads 111 and 112 (refer to FIG. 6), and the second surface 520 may be parallel to the protruding direction of the electrode leads 111 and 112. Here, the protruding direction of the electrode leads 111 and 112 is parallel to the x-axis, and is parallel to the direction from where the battery cell 110 is positioned to where the busbar frame 420** is positioned.

Referring to FIG. 10 and FIG. 11, when the protruding portion **110*p* is inserted into the guide groove 500*g*, the first side 510 forming the oblique inclination can be positioned corresponding to the protruding portion 110*p*. In addition, the protruding portion 110*p* before insertion may be positioned not to correspond to the inner portion 500*i* of the guide groove 500*g*. Based on this, regarding the behavior in which the protruding portion 110*p* is inserted, the inserted protruding portion 110*p* may be naturally bent obliquely by the first side 510 of the adjusting portion 500*a* which forms the oblique inclination. Finally, when the protruding portion 110*p* is inserted up to the inner portion 500*i*, the protruding portion 110*p*** can maintain the bent state.

Referring back to FIG. 8, the guide groove **500*g* according to the present embodiment may be provided in a plurality to correspond to each of the plurality of battery cells 110. It is preferable that the plurality of guide grooves 500*g* are formed in the guide portion 500 such that all protruding portions 110***p* of the respective battery cell 110 can be inserted.

Hereinafter, referring to FIG. 12 and FIG. 13, the merit of the guide groove according to the present embodiment will be explained through comparison with a comparative example.

Figures 12A, 12B:
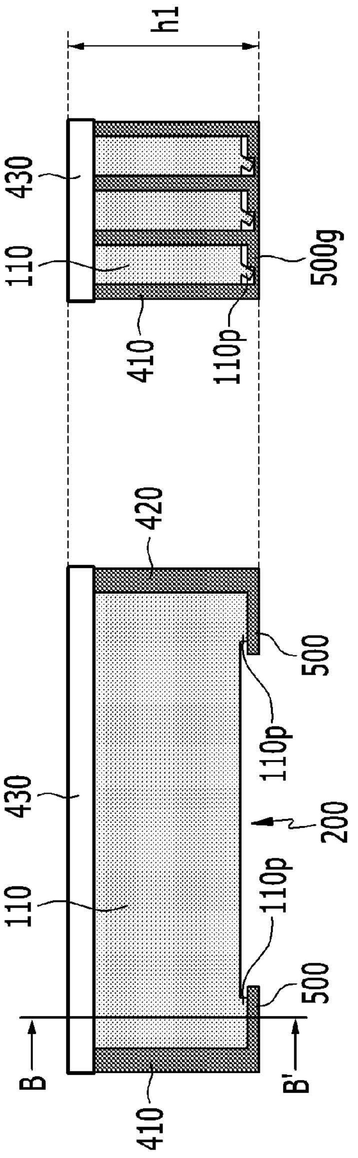
FIG. 12A and FIG. 12B are schematic diagrams illustrating the battery cell stack and the busbar frame according to an embodiment of the present disclosure.

FIGS. 12A and 12B are schematic diagrams illustrating the battery cell stack and the busbar frame according to the embodiment of the present disclosure. Specifically, FIG. 12A schematically illustrates the battery cell stack 200 and the busbar frames 410 and 420, and FIG. 12B schematically illustrates a cross-section of FIG. 12A, taken along the line B-B'.

Referring to FIGS. 12A and 12B, the busbar frames 410 and 420 may be disposed on the front and rear surfaces of the battery cell stack 200, respectively, and the upper cover 430 may be disposed on the upper surface of the battery cell stack 200. As the protruding portion 110*p* of the battery cell 110 according to the present embodiment is inserted into the guide groove 500*g* of the guide portion 500, it does not stand vertically, but is bent in a certain direction. As the protruding portion 110*p* is bent at an angle, a height h1 of the busbar frames 410 and 420 can be reduced.

Figure 13B:
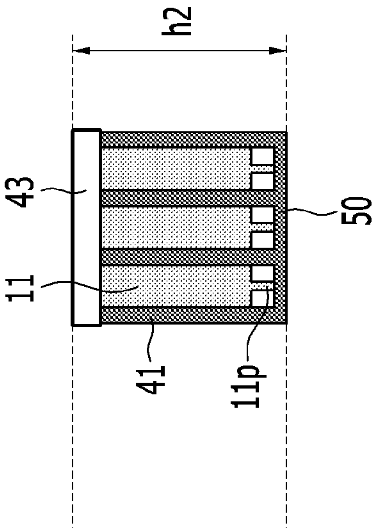
FIG. 13A and FIG. 13B are schematic diagrams illustrating a battery cell stack and a busbar frame according to a comparative example of the present disclosure.
Figure 13A:
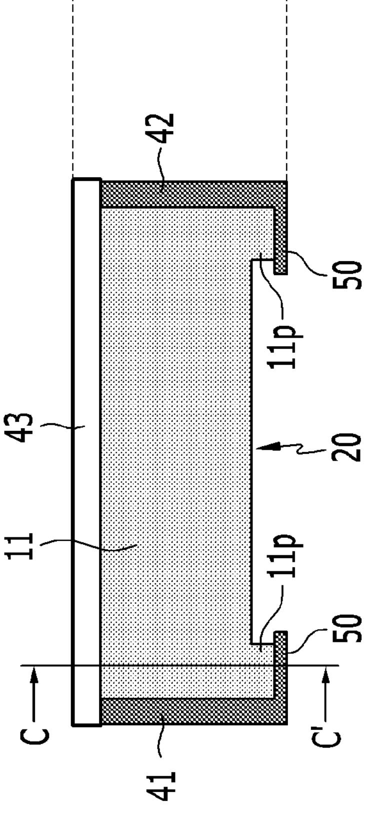

FIGS. 13A and 13B are schematic views schematically illustrating a battery cell stack and a busbar frame according to a comparative example of the present disclosure. Specifically, FIG. 13A schematically shows the battery cell stack 20 and the bus bar frames 41 and 42, and FIG. 13B schematically shows a cross-section taken along the cut line C-C' of FIG. 13A.

Referring to FIGS. 13A and 13B, the busbar frames 41 and 42 are respectively disposed in the front and the rear of the battery cell stack 20, and the upper cover 43 may be positioned on a top surface of the battery cell stack 20. Unlike the busbar frames 410 and 420 according to the present embodiment, no guide groove is formed in the guide portion 50. According to the comparative example, a protruding portion 11*p* of the battery cell 11 is erected vertically without bending, and a height h2 of the busbar frames 41 and 42 increases accordingly.

That is, compared to the height h2 of busbar frames 41 and 42 according to the comparative example, the height h1 of the busbar frames 410 and 420 according to the present embodiment can be reduced as much as the protruding portion 110*p* is obliquely bent by the guide groove 500*g*. Finally, the height of the battery module 100 can be reduced, and the space can be efficiently used as that much. As the capacity can be increased by as much as the height of the reduced battery module, it has the effect of increasing capacity and energy.

In addition, referring to FIG. 5, as the protruding portion 110*p* is bent, a thickness of the thermally conductive resin layer 900 can be reduced. That is, the thermally conductive resin layer 900 can be formed by applying only the minimum amount of thermally conductive resin necessary for heat dissipation. Accordingly, it is possible to reduce the amount of the thermally conductive resin used, which has an effect of reducing costs.

Figure 15:
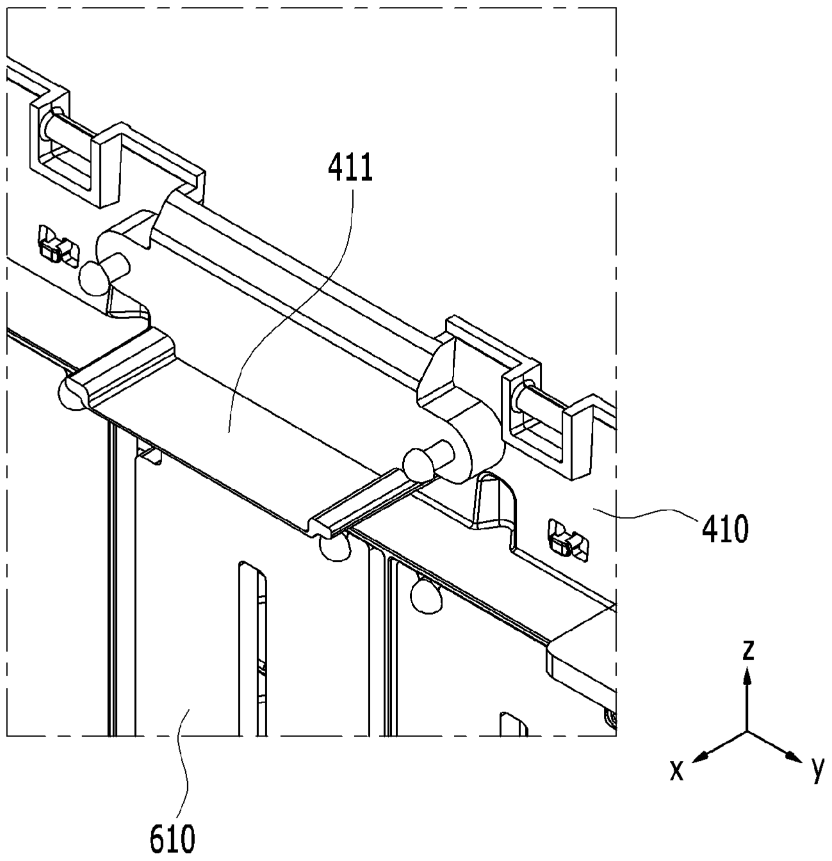
FIG. 15 and FIG. 16 are partial diagrams showing the appearance of the busbar frame before and after disposal of the sensing unit according to an embodiment of the present disclosure, respectively.
Figure 16:
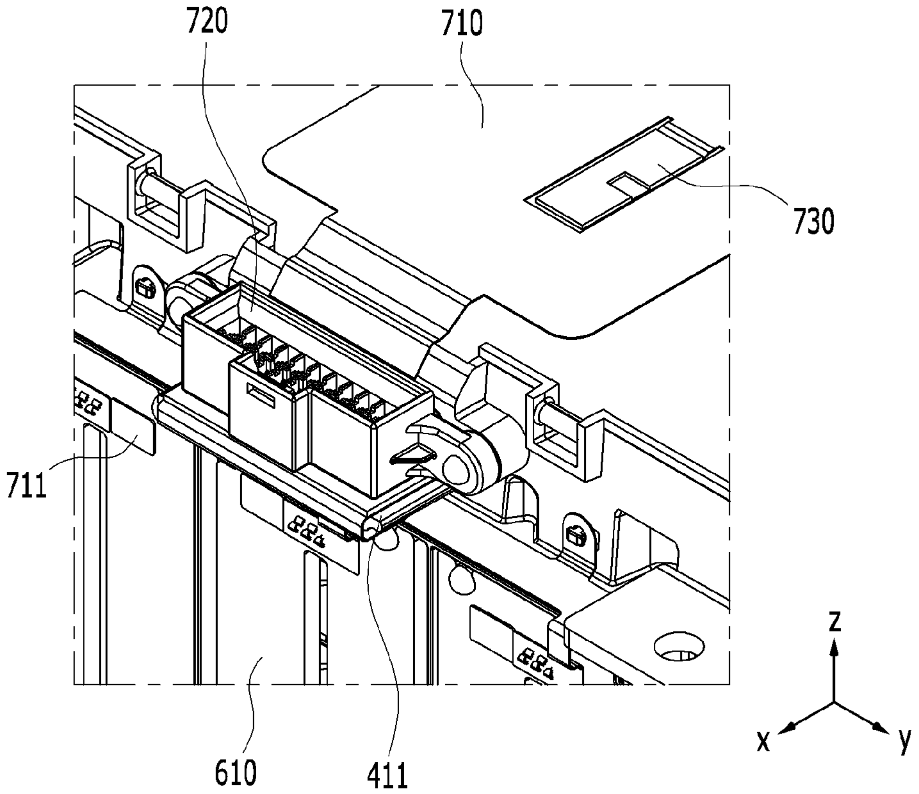

Hereinafter, referring to FIG. 14 to FIG. 16, a sensing unit according to the present embodiment will be described in detail.

Figure 14:
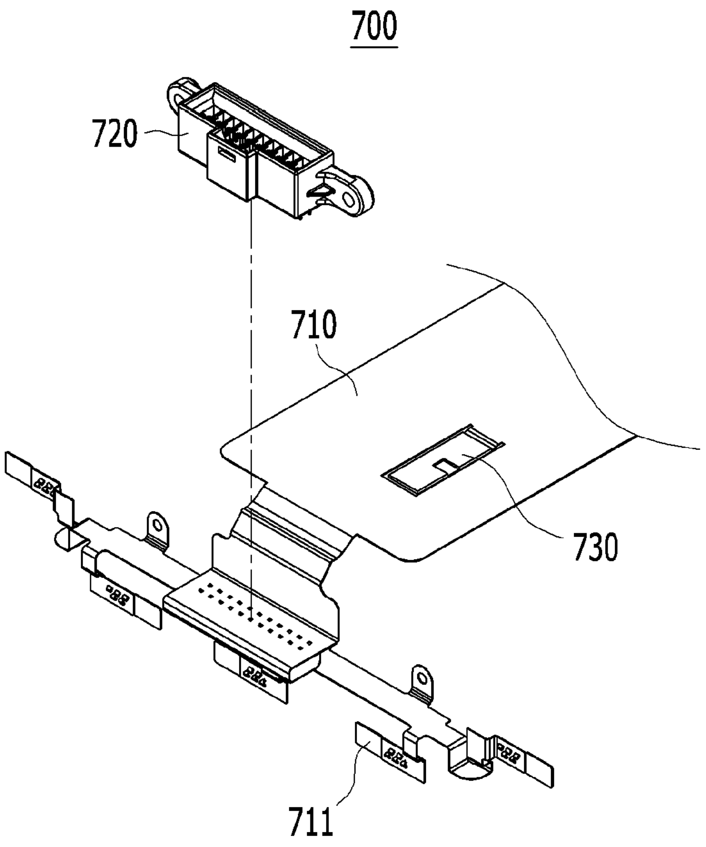
FIG. 14 is a perspective view of a sensing unit according to an embodiment of the present disclosure.

FIG. 14 is a perspective view of a sensing unit according to the embodiment of the present disclosure. FIG. 15 and FIG. 16 are partial diagrams showing the appearance of the busbar frame before and after disposal of the sensing unit according to the embodiment of the present disclosure, respectively.

Referring to FIG. 3 and FIG. 14 to FIG. 16, the battery module according to the embodiment of the present disclosure may further include a sensing unit 700 for sensing voltage information. The sensing unit 700 is for low-voltage (LV) connection, where the LV connection means a sensing connection for sensing and controlling a voltage of a battery cell. Voltage information and temperature information of the battery cell 110 can be transmitted to an external battery management system (BMS) through the sensing unit 700.

The sensing unit 700 may include a connection portion member 710, a module connector 720, and a temperature sensor 730. The connection portion member 710 may extend along a length direction of the battery cell stack 200 between the upper cover 430 and the upper surface of the battery cell stack 200. In addition, the connection portion member 710 may include sensing terminals 711 attached to the busbars 610. The connection portion member 710 may be a flexible printed circuit board (FPCB) or a flexible flat cable (FFC).

The module connector 720 may be form to transmit and receive signals to and from an external control device to control the plurality of battery cells 110. The module connector 720 may be positioned on the opposite side to a side facing the battery cell stack 200 among busbar frames 410 and 420. More specifically, a connector support portion 411 is formed in the busbar frames 410 and 420, and the module connector 720 may be placed on the connector support portion 411 together with the connection portion member 710.

The sensing terminals 711 are attached to the busbar 610 mounted on the busbar frames 410 and 420 to sense the voltage value. Voltage data sensed by the sensing terminals 711 can be transmitted to the BMS through the connection portion 710 and the module connector 720, and the BMS (not shown) may control charging and discharging of the battery cells 110 based on the collected voltage data.

The connection portion member 710 may further include a temperature sensor 730. In general, since the battery cell 110 has the highest temperature around the electrode leads 111 and 112, the temperature sensor 730 is preferably positioned at both edges of the battery cell stack 200. Like the voltage data, temperature data sensed by the temperature sensor 730 may be transmitted to the BMS through the connection portion member 710 and the module connector 720.

That is, the sensing unit 700 may detect and control phenomena such as overvoltage, overcurrent, and overheating of each battery cell 110.

Meanwhile, referring to FIG. 1 and FIG. 2, the end plates 810 and 820 are joined to the module frame 300 in a state in which the battery cell stack 200 is accommodated, thereby completing the battery module 100. The module frame 300 and the end plates 810 and 820 preferably include a metal material to have predetermined strength to protect the battery cell stack 200 and other electrical equipment, and may include, for example, aluminum (Al).

In this case, an opening may be formed in the end plates 810 and 820 such that the terminal busbar 620 and the module connector 720 can be exposed. The exposed terminal busbar 620 may be electrically connected to another battery module or an external battery disconnect unit (BDU) to form an HV connection. In addition, the exposed module connector 720 may be connected to an external BMS to form an LV connection.

In the present embodiment, terms indicating direction such as before, after, left, right, up, and down are used, but these terms are only for convenience of explanation, and may vary depending on the position of the object or the position of the observer.

One or more battery modules according to the present embodiment described above may be mounted together with various control and protection systems such as a battery management system, a battery disconnect unit, and a cooling system, to form a battery pack.

The battery module or battery pack can be applied to various devices. Specifically, it can be applied to transportation means such as electric bicycles, electric vehicles, hybrids, and the like, but is not limited thereto and can be applied to various devices that can use secondary batteries.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF REFERENCE NUMERALS

100: battery module
110: battery cell
110*p*: protruding portion
111, 112: electrode lead
200: battery cell stack
300: module frame
410, 420: busbar frame
500: guide portion
500*g*: guide groove
500*a*: adjusting portion

What is claimed is:

1. A battery module comprising:

a battery cell stack in which a plurality of battery cells including protruded electrode leads are stacked;

a module frame that houses the battery cell stack; and busbar frames disposed to a front and a rear of the battery cell stack where the electrode leads are protruded, wherein the battery cell includes protruding portions respectively formed at both ends of a lower edge of the battery cell, wherein at least one of the busbar frames include a guide portion extending to a lower surface of the battery cell stack, wherein the guide portion comprises a guide groove into which the protruding portion is inserted, wherein the guide groove includes an adjusting portion of which a width becomes narrower from where the battery cell is positioned to where the busbar frame is positioned, and wherein the protruding portion is obliquely bent by the adjusting portion to reduce a height of the busbar frame.

2. The battery module of claim 1, wherein, when the busbar frame is disposed to the front or the rear of the battery cell stack, the protruding portion of the battery cell is inserted into the guide groove.

3. The battery module of claim 1, wherein the adjusting portion is opened in a direction to where the battery cell is located.

4. The battery module of claim 1, wherein the guide groove comprises an inner portion that is farther from the battery cell than the adjusting portion, and the protruding portion is inserted into the inner portion.

5. The battery module of claim 1, wherein the adjusting portion comprises a first side and a second side that face each other, and the first side and the second side become closer from where the battery cell is positioned to where the busbar frame is positioned.

6. The battery module of claim 5, wherein the first side forms an inclined plane oblique to a protruding direction of the electrode lead, and wherein, when the protruding portion is inserted into the guide groove, the first side is positioned corresponding to the protruding portion.

7. The battery module of claim 6, wherein the second side is parallel with the protruding direction of the electrode lead.

8. The battery module of claim 1, wherein the guide groove is formed in a plurality to correspond to each of the plurality of battery cells.

9. The battery module of claim 1, wherein a busbar is mounted to the busbar frame, and the electrode lead is bonded to the busbar.

10. A battery pack comprising the battery module of claim 1.

* * * * *